(12) United States Patent
Chatterji et al.

(10) Patent No.: US 8,623,794 B2
(45) Date of Patent: Jan. 7, 2014

(54) SLAG COMPOSITIONS AND METHODS OF USE

(71) Applicant: Halliburton Energy Services, Inc., Houston, TX (US)

(72) Inventors: Jiten Chatterji, Duncan, OK (US); Callie R. Jarratt, Duncan, OK (US); D. Chad Brenneis, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/864,358

(22) Filed: Apr. 17, 2013

(65) Prior Publication Data

US 2013/0231416 A1    Sep. 5, 2013

Related U.S. Application Data

(62) Division of application No. 13/421,034, filed on Mar. 15, 2012, now Pat. No. 8,492,317, which is a division of application No. 13/283,321, filed on Oct. 27, 2011, now Pat. No. 8,162,058.

(51) Int. Cl.
*C09K 8/467* (2006.01)

(52) U.S. Cl.
USPC ........... 507/221; 507/219; 507/225; 507/231; 507/266; 507/269; 166/285

(58) Field of Classification Search
None
See application file for complete search history.

(56) References Cited

U.S. PATENT DOCUMENTS

| | | | |
|---|---|---|---|
| 4,761,183 A | 8/1988 | Clarke | |
| 4,897,119 A | 1/1990 | Clarke | |
| 5,026,215 A | 6/1991 | Clarke | |
| 5,106,423 A | 4/1992 | Clarke | |
| 5,293,938 A | 3/1994 | Onan et al. | |
| 5,314,022 A * | 5/1994 | Cowan et al. | 166/293 |
| 5,372,641 A | 12/1994 | Carpenter | |
| 5,547,506 A | 8/1996 | Rae et al. | |
| 5,588,489 A | 12/1996 | Chatterji et al. | |
| 5,711,801 A | 1/1998 | Chatterji et al. | |
| 5,964,293 A | 10/1999 | Chatterji et al. | |
| 6,068,055 A | 5/2000 | Chatterji et al. | |
| 6,184,287 B1 | 2/2001 | Westerman | |
| 6,231,664 B1 | 5/2001 | Chatterji et al. | |
| 6,488,764 B2 | 12/2002 | Westerman | |
| 6,516,884 B1 | 2/2003 | Chatterji et al. | |
| 6,562,122 B2 | 5/2003 | Dao et al. | |
| 6,641,660 B1 | 11/2003 | Chatterji et al. | |
| 6,776,237 B2 | 8/2004 | Dao et al. | |
| 7,013,975 B2 | 3/2006 | Chatterji et al. | |
| 7,022,755 B1 | 4/2006 | Chatterji et al. | |
| 7,077,203 B1 | 7/2006 | Roddy et al. | |
| 7,147,705 B2 | 12/2006 | Chatterji et al. | |
| 7,204,307 B2 | 4/2007 | Roddy et al. | |
| 7,353,870 B2 | 4/2008 | Roddy et al. | |
| 7,387,675 B2 | 6/2008 | Roddy et al. | |
| 7,393,814 B2 | 7/2008 | Chatterji et al. | |
| 7,395,860 B2 | 7/2008 | Roddy et al. | |
| 7,404,855 B2 | 7/2008 | Chatterji et al. | |
| 7,445,669 B2 | 11/2008 | Roddy et al. | |
| 7,784,542 B2 | 8/2010 | Roddy et al. | |
| 7,789,150 B2 | 9/2010 | Roddy et al. | |
| 7,863,224 B2 | 1/2011 | Keys et al. | |
| 7,927,419 B2 | 4/2011 | Roddy et al. | |
| 8,030,253 B2 | 10/2011 | Roddy et al. | |
| 8,162,058 B1 | 4/2012 | Chatterji et al. | |
| 8,297,357 B2 | 10/2012 | Brenneis et al. | |
| 8,307,899 B2 | 11/2012 | Brenneis et al. | |
| 8,324,137 B2 | 12/2012 | Roddy et al. | |
| 2008/0220994 A1 | 9/2008 | Chatterji et al. | |
| 2009/0236097 A1 * | 9/2009 | Roddy et al. | 166/293 |
| 2010/0096135 A1 | 4/2010 | Roddy et al. | |
| 2010/0273912 A1 | 10/2010 | Roddy et al. | |
| 2011/0257303 A1 | 10/2011 | Moussias et al. | |

FOREIGN PATENT DOCUMENTS

| | | |
|---|---|---|
| KR | 100847375 | 7/2008 |
| WO | 2010017571 | 2/2010 |

OTHER PUBLICATIONS

PCT International Search Report and Written Opinion for International Application No. PCT/US2012/062149 dated Apr. 4, 2013.
HES Brochure "Slag Mix™ Cementing System", Aug. 2007.
HES Brochure "Latex 2000 Cement Additive", Aug. 2006.
HES Brochure "Latex 3000™ Cement Additive", Jun. 2010.
HES Brochure "D-Air 4000 L™ Cementing Defoamer", Sep. 2007.
HES Brochure "D-Air 3000™ and D-Air 3000L™ Defoamers", Jun. 2007.
HES Brochure "D-Air 5000™ Defoamer", Aug. 2011.
HES Brochure "Stabilizer 434D™ Surfactant", Feb. 2008.
HES Brochure "CFR-3™ Cement Friction Reducer", Oct. 2005.
HES Brochure "HR®—5 Cement Additives", Aug. 2007.
SPE 24294 "Successful Remedial Operations Using Ultrafine Cement", 1992.
USPTO Office Action for U.S. Appl. No. 13/283,321, filed Feb. 10, 2012.
USPTO Notice of Allowance for U.S. Appl. No. 13/283,321, filed Mar. 14, 2012.
USPTO Office Action for U.S. Appl. No. 13/421,034, filed Aug. 31, 2012.
USPTO Notice of Allowance for U.S. Appl. No. 13/421,034, filed Feb. 22, 2013.
U.S. Appl. No. 13/421,034, filed Mar. 15, 2012.

* cited by examiner

*Primary Examiner* — John J Figueroa
(74) *Attorney, Agent, or Firm* — Craig W. Roddy; Tumey L.L.P.

(57) ABSTRACT

Methods and compositions are provided that relate to cementing operations. Methods and compositions that include a latex strength enhancer for enhancing the compressive strength of slag compositions.

20 Claims, No Drawings

SLAG COMPOSITIONS AND METHODS OF USE

CROSS-REFERENCE TO RELATED APPLICATIONS

The present application is a divisional of U.S. patent application Ser. No. 13/421,034, filed on Mar. 15, 2012, entitled "Slag Compositions and Methods of Use," which is a divisional of U.S. patent application Ser. No. 13/283,321, now U.S. Pat. No. 8,162,058, filed on Oct. 27, 2011, entitled "Slag Compositions and Methods of Use," the entire disclosure of which is incorporated herein by reference.

BACKGROUND

The present invention relates to cementing operations and, more particularly, in certain embodiments, to methods and compositions that utilize a latex strength enhancer for enhancing the compressive strength of slag compositions.

In cementing operations, such as well construction and remedial cementing, settable compositions are commonly utilized. As used herein, the teen "settable composition" refers to a composition) that hydraulically sets or otherwise develops compressive strength. Settable compositions may be used in primary cementing operations whereby pipe strings, such as casing and liners, are cemented in well bores. In a typical primary cementing operation, a settable composition may be pumped into an annulus between the walls of the well bore and the exterior surface of the pipe string disposed therein. The settable composition may set in the annular space, thereby forming an annular sheath of hardened, substantially impermeable material (e.g., a cement sheath) that may support and position the pipe string in the well bore and may bond the exterior surface of the pipe string to the well bore walls. Among other things, the cement sheath surrounding the pipe string should function to prevent the migration of fluids in the annulus, as well as protecting the pipe string from corrosion. Settable compositions also may be used in remedial cementing methods, such as in the placement of plugs, and in squeeze cementing for sealing voids in a pipe string, cement sheath, gravel pack, subterranean formation, and the like.

A particular challenge in cementing operations is the development of satisfactory mechanical properties in a settable composition within a reasonable time period after placement in the subterranean formation. During the life of a well, the subterranean cement sheath undergoes numerous strains and stresses as a result of temperature effects, pressure effects, and impact effects. The ability to withstand these strains and stresses is directly related to the mechanical properties of the settable composition after setting. The mechanical properties are often characterized using parameters such as compressive strength, tensile strength, Young's Modulus, Poisson's Ratio, elasticity, and the like. These properties may be modified by the inclusion of additives.

One type of settable composition that has been used heretofore comprises slag cement, which is typically a blend of Portland cement and slag. Because Portland cement develops compressive strength much more rapidly than slag, the amount of slag is typically limited to no more than 40% by weight of the slag cement. Drawbacks to slag cement include the relatively high cost of the Portland cement as compared to the slag, which is a waste material. Drawbacks to using higher concentrations of slag may include the inability for the settable composition to develop adequate compressive strength in a reasonable time and ensure the long-term structural integrity of the cement.

Thus, there exists a need for settable compositions that comprise slag with enhanced mechanical features that develop adequate compressive strength for use in cementing operations.

SUMMARY

An embodiment discloses a method of cementing, the method comprising: providing a slag composition comprising a hydraulic cement consisting essentially of slag, a hydroxyl source, a latex strength enhancer, and water; introducing the slag composition into a subterranean formation; and allowing the slag composition to set.

Another embodiment discloses a method of cementing, the method comprising: preparing a base fluid comprising a latex strength enhancer, a defoaming agent, and a dispersant; preparing a dry blend comprising slag and a hydroxyl source; combining the base fluid and the dry blend to form a slag composition; introducing the slag composition into a subterranean formation; and allowing the slag composition to set.

Yet another embodiment discloses a slag composition, the slag composition comprising: a hydraulic cement consisting essentially of slag; a hydroxyl source; a latex strength enhancer; and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the present invention disclose slag compositions comprising slag, a hydroxyl source, a latex strength enhancer, and water. One of the many potential advantages of embodiments of the slag compositions is that use of the latex strength enhancer may provide the slag compositions with adequate compressive strengths for use in subterranean applications despite the increased slag content. By way of example, the compressive strength of the slag compositions containing the latex-strength enhancer may be increased by at least about 25% in one embodiment, at least about 50% in another embodiment, and at least about 75% in yet another embodiment, as compared to the same slag composition that does not contain the latex strength enhancer. Accordingly, embodiments of the slag compositions may be used in a variety of subterranean applications where settable compositions may be used, including, but not limited to, primary and remedial cementing.

In some embodiments, the slag compositions may comprise slag. Slag is generally a by-product in the production of various metals from their corresponding ores. By way of example, the production of cast iron can produce slag as a granulated, blast furnace by-product with the slag generally comprising the oxidized impurities found in iron ore. The slag may be included in embodiments of the slag compositions in an amount suitable for a particular application. In some embodiments, the slag may be present in an amount of about 40% to about 100% by weight of cementitious components ("bwoc"), for example, about 40%, about 50%, about 60%, about 70%, about 80%, about 90%, or about 100%. Cementitious components include those components or combinations of components of the slag compositions that hydraulically set, or otherwise harden, to develop compressive strength, including, for example, slag, fly ash, hydraulic cement, and the like. In certain embodiments, the slag may be present in an amount greater than about 40% bwoc, greater than about 50% bwoc, greater than about 60% bwoc, greater than about 70% bwoc, greater than about 80% bwoc, or greater than about 90% bwoc. In some embodiments, hydraulic cement included in the slag compositions may consist essentially of the slag.

In some embodiments, the slag compositions may comprise a hydroxyl source. The hydroxyl source is included in the slag compositions for providing hydroxyl groups for activation of the slag to provide a settable composition that will react with the water to form a hardened mass in accordance with embodiments of the present invention. Any of a variety of suitable hydroxyl sources may be used that are capable of generating hydroxyl groups (OH$^-$) when dissolved in the water. Examples of suitable hydroxyl sources include basic materials, such as sodium hydroxide, sodium bicarbonate, sodium carbonate, lime, and any combination thereof In some embodiments, the hydroxyl source may be present in the slag compositions in an amount in the range of from about 0.1% to about 25% bwoc. In further embodiments, the hydroxyl source may be included in an amount in the range of from about 1% to about 10% bwoc.

In some embodiments, the slag compositions may comprise a latex strength enhancer. Surprisingly, inclusion of the latex strength enhancer in embodiments of the slag compositions of the present invention provides enhanced compressive strength as compared to slag compositions that do not contain the latex strength enhancer. As will be understood by those skilled in the art, the latex strength enhancer may comprise any of a variety of rubber materials that are commercially available in latex form. Non-limiting examples of suitable rubber materials are available from Halliburton Energy Services, Duncan, Okla., under the names Latex 2000™ cement additive and Latex 3000™ cement additive. Suitable rubber materials include natural rubber (e.g., cis-1,4-polyisoprene), modified natural rubber, synthetic rubber, and combinations thereof Synthetic rubber of various types may be utilized, including ethylene-propylene rubbers, styrene-butadiene rubbers, nitrile rubbers, nitrile butadiene rubbers, butyl rubber, neoprene rubber, polybutadiene rubbers, acrylonitrile-styrene-butadiene rubber, polyisoprene rubber, AMPS-styrene-butadiene rubber, and any combination thereof. As used herein, the term "AMPS" refers to 2-acrylamido-2-methyl-propanesulfonic acid or salts thereof. In certain embodiments, the synthetic rubber may comprise AMPS in an amount ranging from about 5% to about 10% by weight, styrene in an amount ranging from about 30% to about 70% by weight, and butadiene in an amount ranging from about 30% to about 70% by weight. Examples of suitable AMPS-styrene-butadiene rubbers are described in more detail in U.S. Pat. Nos. 6,488,764 and 6,184,287, the entire disclosures of which are incorporated herein by reference. Those of ordinary skill in the art will appreciate that other types of synthetic rubbers are also encompassed within the present invention.

In certain embodiments, the latex strength enhancer comprises a water-in-oil emulsion that comprises styrene-butadiene rubber. As will be appreciated, the aqueous phase of the emulsion comprises an aqueous colloidal dispersion of the styrene-butadiene copolymer. Moreover, in addition to the dispersed styrene-butadiene copolymer, the emulsion may comprise water in the range of from about 40% to about 70% by weight of the emulsion and small quantities of an emulsifier, polymerization catalysts, chain modifying agents, and the like. As will be appreciated, styrene-butadiene latex is often produced as a terpolymer emulsion that may include a third monomer to assist in stabilizing the emulsion. Non-ionic groups which exhibit stearic effects and which contain long ethoxylate or hydrocarbon tails also may be present.

In accordance with embodiments of the present invention, the weight ratio of the styrene to the butadiene in the emulsion may range from about 10:90 to about 90:10. In some embodiments, the weight ratio of the styrene to the butadiene in the emulsion may range from about 20:80 to about 80:20. An example of suitable styrene-butadiene latex has a styrene-to-butadiene weight ratio of about 25:75 and comprises water in an amount of about 50% by weight of the emulsion. Another example of suitable styrene-butadiene latex has a styrene-to-butadiene weight ratio of about 30:70.

The latex strength enhancer may generally be provided in embodiments of the slag compositions in an amount sufficient for the desired application. In some embodiments, the latex strength enhancer may be included in the slag compositions in an amount in the range of from about 1% to about 45% bwoc. In further embodiments, the latex strength enhancer may be included in the slag compositions in an amount in the range of from about 5% to about 20% bwoc. It should be understood that the concentrations of the latex strength enhancer are provided based on the amount of aqueous latex that may be used.

In some embodiments, the slag compositions may further comprise hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, silica cements, and any combination thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990. In addition, in some embodiments, cements suitable for use in the present invention may include cements classified as ASTM Type I, II, or III.

Where present, the hydraulic cement generally may be included in the slag compositions in an amount sufficient to provide the desired compressive strength, density, and/or cost. In some embodiments, the hydraulic cement may be present in the slag compositions of the present invention in an amount in the range of 0.1% to about 60% bwoc, for example, about 10%, about 20%, about 30%, about 40%, about 50%, or about 60%. In some embodiments, the hydraulic cement may be included in an amount that does not exceed about 60% bwoc, does not exceed about 50% bwoc, does not exceed about 40% bwoc, does not exceed about 30% bwoc, does not exceed about 20% bwoc, does not exceed about 20% bwoc, or does not exceed about 10% bwoc.

In some embodiments, the slag compositions may further comprise a defoaming agent. Where present, the defoaming agent should act, among other things, to prevent foaming during mixing of the slag composition. Because the latex strength enhancer can include emulsifiers and latex stabilizers which can also function as foaming agents, an unstable foam can be formed when the slag is mixed with the latex strength enhancer and water. In general, the defoaming agent should prevent the formation of the unstable foam. The defoaming agent can comprise any of a number of different compounds suitable for such capabilities, such as polyols, silicon defoamers, alkyl polyacrylates, ethylene oxide/propylene oxide compounds, acetylenic diols, and any combination thereof. Non-limiting examples of suitable defoaming agents include those available from Halliburton Energy Services under the names D-AIR 3000™ foamer, D-AIR 4000L™ foamer, and D-AIR 5000™ foamer. The defoaming agent may generally be provided in embodiments of the slag compositions in an amount sufficient for the desired application. In some embodiments, the defoaming agent may be present in the slag compositions in an amount in the range of from about 0.1% to about 5% bwoc. In further embodiments, the defoaming additive may be included in an amount in the range of from about 0.1% to about 2% bwoc.

In some embodiments, the slag compositions may further comprise a dispersant. Where present, the dispersant should act, among other things, to control the rheology of the slag composition. While a variety of dispersants known to those skilled in the art may be used in accordance with the present invention, examples of suitable dispersants include naphthalene sulfonic acid condensate with formaldehyde; acetone, formaldehyde, and sulfite condensate; melamine sulfonate condensed with formaldehyde; any combination thereof. Where used, the dispersant should be present in embodiments of the slag compositions of the present invention in an amount sufficient to prevent gelation of the slag composition and/or improve rheological properties. In some embodiments, the dispersant may be present in the slag compositions in an amount in the range of from about 0.1% to about 5% bwoc.

The water used in embodiments of the slag compositions of the present invention may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the slag composition. In some embodiments, the water may be included in an amount sufficient to form a pumpable slurry. In some embodiments, the water may be included in the slag compositions of the present invention in an amount of about 40% to about 200% by dry weight of cementitious components ("bwoc"). In some embodiments, the water may be included in an amount of about 40% to about 150% bwoc.

Other additives suitable for use in subterranean cementing operations may also be added to embodiments of the slag compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, fluid loss control additives, foaming additives, thixotropic additives, and any combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, any combination thereof, and the like. A person having ordinary skill in the art, with the benefit of this disclosure, will readily be able to determine the type and amount of additive useful for a particular application and desired result.

Those of ordinary skill in the art will appreciate that embodiments of the slag compositions generally should have a density suitable for a particular application. By way of example, embodiments of the slag compositions may have a density of about 12 pounds per gallon ("lb/gal") to about 20 lb/gal. In certain embodiments, the slag compositions may have a density of about 14 lb/gal to about 17 lb/gal. In certain embodiments, the slag composition may be a heavyweight composition having a density of at least about 14 lb/gal. Those of ordinary skill in the art, with the benefit of this disclosure, will recognize the appropriate density for a particular application.

In some embodiments, the slag compositions may be prepared by combining the slag with water. The latex strength enhancer and other additives may be combined with the water before it is added to the slag. For example, a base fluid may be prepared that comprises the latex strength enhancer, the defoaming additive, the dispersant, and the water, wherein the base fluid is then combined with the slag. In some embodiments, the slag may be dry blended with other additives, such as the hydroxyl source and/or the hydraulic cement, to faun a dry blend, wherein the dry blend may then be combined with the water or base fluid. Other suitable techniques may be used for preparation of the slag compositions as will be appreciated by those of ordinary skill in the art in accordance with embodiments of the present invention.

As will be appreciated by those of ordinary skill in the art, embodiments of the slag compositions may be used in a variety of subterranean applications, including primary and remedial cementing. Embodiments may include providing a slag composition and allowing the slag composition to set. Embodiments of the slag compositions may comprise, for example, slag, a hydroxyl source, a latex strength enhancer, and water. Embodiments of the slag compositions may further comprise one or more of a hydraulic cement, a defoaming additive, or a dispersant, as well as a variety of other additives suitable for use in subterranean cementing applications as will be apparent to those of ordinary skill in the art.

In primary cementing embodiments, for example, a slag composition may be introduced into a subterranean formation between a conduit (e.g., pipe string, liner, etc.) and a well bore wall. The slag composition may be allowed to set to form an annular sheath of hardened cement in the space between the well bore wall and the conduit. Among other things, the sheath formed by the slag composition may form a barrier, preventing the migration of fluids in the well bore. The sheath formed by the slag composition also may, for example, support the conduit in the well bore.

In remedial cementing embodiments, a slag composition may be used, for example, in squeeze-cementing operations or in the placement of plugs. By way of example, the slag composition may be placed in a well bore to plug a void or crack in the formation, in a gravel pack, in the conduit, in the cement sheath, and/or a microannulus between the cement sheath and the conduit. In another embodiment, the slag composition may be placed into a well bore to form a plug in the well bore with the plug, for example, sealing the well bore.

To facilitate a better understanding of the present invention, the following examples of some of the preferred embodiments are given. In no way should such examples be read to limit, or to define, the scope of the invention.

Example 1

The following series of tests were performed to evaluate the mechanical properties of slag compositions. Five different slag compositions, designated Samples 1-5, were prepared using the indicated amounts of water, slag, lime, a latex strength enhancer, a latex stabilizer, and a cement dispersant. The amounts of these components are indicated in the table below with percent by weight of cement ("% bwoc") indicating the percent of the component by weight of slag and gallon per sack ("gal/sk") indicating the gallons of the respective component per 94-pound sack of slag. The slag compositions had a density of 14.5 lb/gal. The latex strength enhancer used was either Latex™ 2000 cement additive or Latex™ 3000 cement additive as indicated in Table 1 below. Sample 1 was a comparative composition that did not include the latex strength enhancer. The latex stabilizer was Stabilizer 434D™ surfactant, from Halliburton Energy Services, Inc., Duncan, Okla. The dispersant used was CFR-3L™ cement friction reducer, from Halliburton Energy Services, Inc., Duncan, Okla. The slag compositions were subjected to 24-hour compressive strength tests at 140° F. in accordance with API Specification 10.

TABLE 1

| Sample | Ingredients | | | | | | | 24 Hr Comp. Strength (psi) |
|---|---|---|---|---|---|---|---|---|
| | Water (% bwoc) | Slag (% bwoc) | Lime (% bwoc) | Latex™ 2000 additive (gal/sk) | Latex™ 3000 additive (gal/sk) | Latex Stabilizer (gal/sk) | Cement Dispersant (gal/sk) | |
| 1 (comp.) | 57.58 | 100 | 10 | — | — | — | — | 862 |
| 2 | 37.16 | 100 | 10 | 2 | — | 0.2 | 0.15 | 1,328 |
| 3 | 37.16 | 100 | 10 | — | 2 | 0.2 | 0.15 | 1,683 |
| 4 | 39.81 | 100 | 10 | — | 2 | — | — | 1,346 |
| 5 | 38.07 | 100 | 5 | — | 2 | — | — | 1,401 |

Based on the results of these tests, inclusion of a latex strength enhancer in the slag compositions had a significant impact on compressive strength development. For example, increases in compressive strength of least about 50% (Sample 2) and up to about 95% (Sample 3) were obtained by including 2 gal/sk of the latex strength enhancer in the slag compositions.

Example 2

The following series of tests were performed to evaluate the effect of including a latex strength enhancer on the thickening times of slag compositions. Three different slag compositions, designated Samples 6-8, were prepared using the indicated amounts of water, slag, lime, a latex strength enhancer, and a cement set retarder. The amounts of these components are indicated in the table below with % bwoc indicating the percent of the component by weight of slag and gal/sk indicating the gallons of the respective component per 94-pound sack of slag. The slag compositions had a density of 14.5 lb/gal. The latex strength enhancer used was Latex™ 3000 cement additive. The cement set retarder used was HR®-5 retarder, from Halliburton Energy Services, Inc., Duncan, Okla. The slag compositions were tested to determine their thickening times at 140° F., which is the time required for the compositions to reach 70 Bearden units of consistency.

TABLE 2

| Sample | Ingredients | | | | | Thick Time hr:min (70 bc) |
|---|---|---|---|---|---|---|
| | Water (% bwoc) | Slag (% bwoc) | Lime (% bwoc) | Latex™ 3000 additive (gal/sk) | Cement Set Retarder (% bwoc) | |
| 6 | 37.83 | 100 | 5 | 2 | 0.75 | 45+ |
| 7 | 37.47 | 100 | 5 | 2 | 0.3 | 1:51 |
| 8 | 37.41 | 100 | 5 | 2 | 0.5 | 7:23 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of preparing a slag composition, comprising:
   preparing a base fluid comprising a latex strength enhancer, a defoaming agent, a dispersant, and water;
   preparing a dry blend comprising slag and a hydroxyl source; and
   combining the base fluid and the dry blend to form the slag composition, wherein the hydroxyl source is present in an amount of about 1% to about 10% by weight of cementitious components present in the slag composition, wherein the latex strength enhancer is present in an amount of about 5% to about 20% by weight of the cementitious components present in the slag composition, wherein the water is present in an amount of about 40% to about 150% by weight of the cementitious components present in the slag composition, wherein the slag composition has a density of about 14 pounds per gallon to about 20 pounds per gallon, and wherein the latex strength enhancer increases the 24-hour compressive strength of the slag composition at 140° F. in an amount of about 25% or more.

2. The method of claim 1, wherein the hydroxyl source comprises a basic material selected from the group consisting of sodium hydroxide, sodium bicarbonate, sodium carbonate, lime, and any combination thereof.

3. The method of claim 1, wherein the slag composition has a density of about 14 pounds per gallon to about 17 pounds per gallon.

4. The method of claim 1, wherein the latex strength enhancer comprises a rubber material selected from the group consisting of ethylene-propylene rubber, styrene-butadiene rubber, nitrile rubber, nitrile butadiene rubber, butyl rubber, neoprene rubber, polybutadiene rubber, acrylonitrile-styrene-butadiene rubber, polyisoprene rubber, 2-acrylamido-2-methylpropanesulfonic acid-styrene-butadiene rubber, and any combination thereof.

5. The method of claim 1, wherein the slag composition further comprises an additive selected from the group consisting of a dispersant, a defoaming agent, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a foaming additive, a thixotropic additive, and any combination thereof.

6. The method of claim 1, wherein the slag composition further comprises an additive selected from the group consisting of crystalline silica, amorphous silica, fumed silica, a salt, a fiber, a hydratable clay, calcined shale, vitrified shale, a microsphere, diatomaceous earth, metakaolin, ground perlite, rice husk ash, zeolite, a resin, and any combination thereof.

7. The method of claim 1, wherein the hydroxyl source comprises lime, wherein the latex strength enhancer comprises 2-acrylamido-2-methylpropanesulfonic acid-styrene-butadiene rubber, wherein the slag is present in the slag composition in an amount of at least about 40% by weight of the cementitious components in the slag composition, and wherein the slag composition has a density of about 14 pounds per gallon to about 17 pounds per gallon.

8. The method of claim 1, wherein the dry blend further comprises a hydraulic cement.

9. The method of claim 1, wherein the latex strength enhancer increases the 24-hour compressive strength of the slag composition at 140° F. in an amount of about 50% or more.

10. The method of claim 1, wherein the dispersant is present in an amount of about 0.1% to about 5% by weight of the cementitious components present in the slag composition, and wherein the dispersant comprises at least on dispersant selected from the group consisting of: a naphthalene sulfonic acid condensate with formaldehyde; an acetone, formaldehyde, and sulfite condensate; a melamine sulfonate condensed with formaldehyde; any combination thereof.

11. The method of claim 1 wherein the hydroxyl source comprises lime.

12. The method of claim 1 wherein the latex strength enhancer comprises a water-in-oil emulsion comprising a styrene-butadiene rubber.

13. A method of preparing a slag composition, comprising:
preparing a base fluid comprising a latex strength enhancer, a defoaming agent, a dispersant, and water;
preparing a dry blend comprising cementitious components and lime, wherein the cementitious components consist essentially of slag; and
combining the base fluid and the dry blend to form the slag composition, the slag composition being essentially free of any additional cementitious components other than the slag, wherein the lime is present in an amount of about 1% to about 10% by weight of the slag, wherein the latex strength enhancer is present in an amount of about 5% to about 20% by weight of the slag, wherein the water is present in an amount of about 40% to about 150% by weight of the slag, wherein the slag composition has a density of about 14 pounds per gallon to about 20 pounds per gallon, and wherein the latex strength enhancer increases the 24-hour compressive strength of the slag composition at 140° F. in an amount of about 25% or more.

14. The method of claim 13, wherein the slag composition has a density of about 14 pounds per gallon to about 17 pounds per gallon.

15. The method of claim 13, wherein the latex strength enhancer comprises a rubber material selected from the group consisting of ethylene-propylene rubber, styrene-butadiene rubber, nitrile rubber, nitrile butadiene rubber, butyl rubber, neoprene rubber, polybutadiene rubber, acrylonitrile-styrene-butadiene rubber, polyisoprene rubber, 2-acrylamido-2-methylpropanesulfonic acid-styrene-butadiene rubber, and any combination thereof.

16. The method of claim 13, wherein the slag composition further comprises an additive selected from the group consisting of a dispersant, a defoaming agent, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a foaming additive, a thixotropic additive, and any combination thereof.

17. The method of claim 13, wherein the slag composition further comprises an additive selected from the group consisting of crystalline silica, amorphous silica, fumed silica, a salt, a fiber, a hydratable clay, calcined shale, vitrified shale, a microsphere, diatomaceous earth, metakaolin, ground perlite, rice husk ash, zeolite, a resin, and any combination thereof.

18. The method of claim 13, wherein the slag composition further comprises a defoaming agent and a dispersant wherein the latex strength enhancer comprises 2-acrylamido-2-methylpropanesulfonic acid-styrene-butadiene rubber, and wherein the slag composition has a density of about 14 pounds per gallon to about 17 pounds per gallon.

19. The method of claim 13, wherein the latex strength enhancer increases the 24-hour compressive strength of the slag composition at 140° F. in an amount of at about 50% or more.

20. The method of claim 13, wherein the dispersant is present in an amount of about 0.1% to about 5% by weight of the slag, and wherein the dispersant comprises at least one dispersant selected from the group consisting of: a naphthalene sulfonic acid condensate with formaldehyde; an acetone, formaldehyde, and sulfite condensate; a melamine sulfonate condensed with formaldehyde; any combination thereof.

* * * * *